(12) United States Patent
Tanner et al.

(10) Patent No.: US 8,193,144 B2
(45) Date of Patent: Jun. 5, 2012

(54) ALKOXYLATED POLYAMINES AND POLYETHERAMINE POLYOL COMPOSITIONS FOR FOAM CONTROL

(75) Inventors: James T. Tanner, Greer, SC (US);
Charles F. Palmer, Jr., Greer, SC (US);
Calvin M. Wicker, Jr., Spartanburg, SC (US)

(73) Assignee: Ethox Chemicals LLC, Greenville, SC (US)

( * ) Notice: Subject to any disclaimer, the term of this patent is extended or adjusted under 35 U.S.C. 154(b) by 534 days.

(21) Appl. No.: 12/285,328

(22) Filed: Oct. 1, 2008

(65) Prior Publication Data
US 2009/0149369 A1      Jun. 11, 2009

Related U.S. Application Data

(60) Provisional application No. 60/960,474, filed on Oct. 1, 2007, provisional application No. 60/960,475, filed on Oct. 1, 2007.

(51) Int. Cl.
*C11D 7/26* (2006.01)
*C11D 7/32* (2006.01)
*C11D 7/50* (2006.01)

(52) U.S. Cl. ....... 510/499; 510/505; 510/506; 8/115.54; 8/181; 106/401; 106/499; 564/1

(58) Field of Classification Search .................. 510/238, 510/235, 499, 505, 506; 8/181, 115.54; 106/401, 106/499; 564/1
See application file for complete search history.

(56) References Cited

U.S. PATENT DOCUMENTS

| | | | | |
|---|---|---|---|---|
| 4,530,945 A | * | 7/1985 | Christenson et al. | 523/400 |
| 5,055,542 A | * | 10/1991 | Honel et al. | 528/45 |
| 5,654,359 A | * | 8/1997 | Hasegawa et al. | 524/514 |
| 6,365,561 B1 | * | 4/2002 | Vinson et al. | 510/235 |
| 6,521,577 B1 | * | 2/2003 | Ofosu-Asante et al. | 510/237 |
| 2003/0092833 A1 | * | 5/2003 | Frieling et al. | 524/589 |

* cited by examiner

*Primary Examiner* — Gregory Delcotto
(74) *Attorney, Agent, or Firm* — Isaac A. Angres

(57) ABSTRACT

This invention relates to novel compounds derived from the reaction of diamines or polyamines with alkylene oxides. The invention also relates to novel compounds derived from the reaction of amine terminated polyethers with epoxide functional compounds. The novel compounds of the invention are particularly useful as wetting and foam control agents. The disclosed compounds exhibit exceptional antifoaming and defoaming activity while simultaneously reducing the dynamic surface tension when incorporated at low levels in water-based systems.

9 Claims, 2 Drawing Sheets

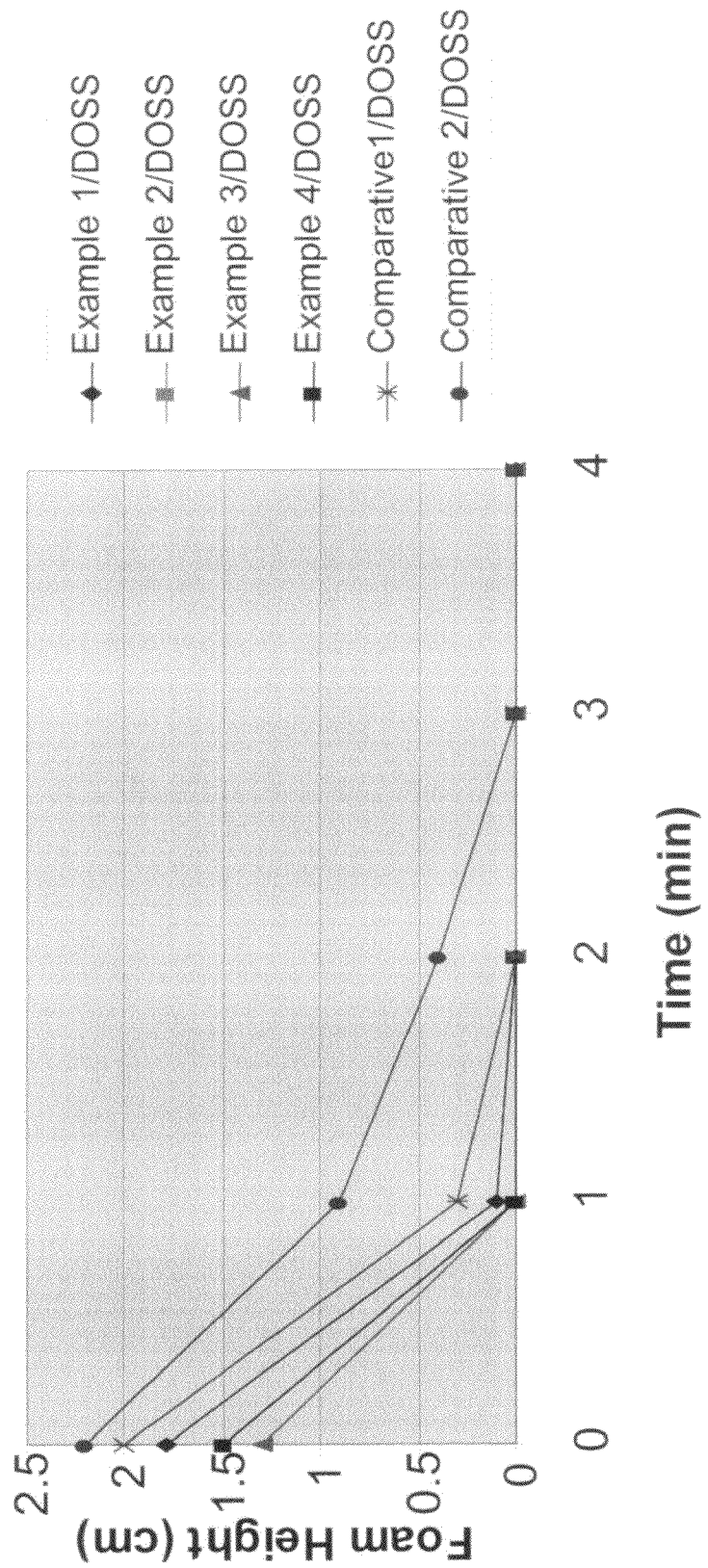

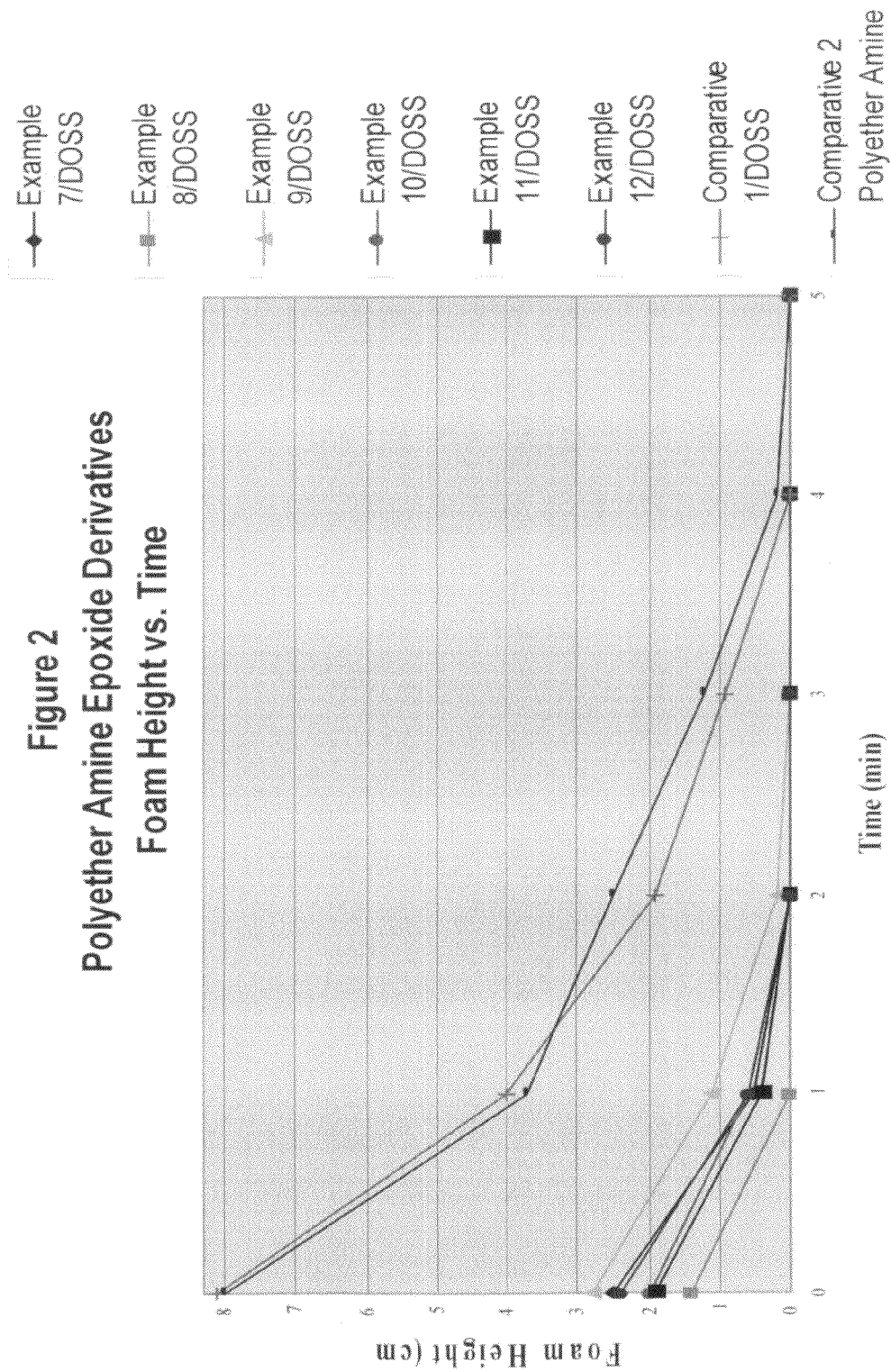

ALKOXYLATED POLYAMINES AND POLYETHERAMINE POLYOL COMPOSITIONS FOR FOAM CONTROL

This application claims the priority benefit under 35 U.S.C. section 119 of U.S. Provisional Patent Application Nos. 60/960,474 and 60/960,475 entitled "Polyetheramine Polyol Compositions For Foam Control" and "Alkoxylated Polyamine Compositions for Foam Control" respectively, both filed on Oct. 1, 2007, and which are in their entirety herein incorporated by reference.

FIELD OF THE INVENTION

The present invention relates to antifoam compositions and more particularly to antifoam compositions which will prevent or abate foaming in aqueous and nonaqueous systems. The present invention also relates to novel antifoaming compounds.

BACKGROUND OF THE INVENTION

The control of foam formation is crucial in many industrial processes such as paper manufacture, waste water treatment and latex paint formulation. In particular, in the manufacture of latex paint, many of the additives required may themselves contribute to foam formation. Surfactants and dispersants are necessary to stabilize both the binder resin and the pigment in the latex. However, these surfactants also stabilize foam under the dynamic conditions of mixing and shear required in the formulation process. Other components such as leveling agents and coalescing aids may also contribute to foam formation. Due to the large effect that additives can have on the final coating properties, a critical requirement for any compound added for foam control is that it must be effective at low concentration. It also must not impart undesirable characteristics to the final coating surface such as fish eyes or pinholes.

When referring to foam control in aqueous systems, it is recognized that there are two separate and distinct phenomena involved. One is the elimination or reduction of existing foam, often referred to as "foam knockdown." Agents or compositions that function in this manner are referred to as defoamers. The other situation that must be considered is the prevention of foam formation in aqueous systems when they are subjected to dynamic conditions such as shear. Agents or compositions that function to prevent foam formation are referred to as antifoams. It is often the case in many industrial aqueous systems that both types of activity are required. In other words, it is often necessary to eliminate existing foam while simultaneously preventing the generation and stabilization of additional foam as the aqueous system is subjected to dynamic conditions. It is often the case that an agent or composition that accomplishes one function will not necessarily accomplish the other. In other words, a composition or agent that is effective in the knockdown of foam may not be effective in preventing the generation and stabilization of foam as the aqueous system is further subjected to dynamic conditions. Thus, an agent or composition that can function as both a defoamer and an antifoam is highly desirable.

The ability of the foam control agent to also function as a wetting agent is also highly desirable. In aqueous systems such as latex paints and waterborne inks, wetting agents such as surfactants and dispersants must be added to wet and stabilize pigment particles in the formulation. Foam control agents that can simultaneously function as wetting agents are highly desirable since fewer additives may be required to achieve the same performance in a particular formulation. The ability of foam control agents to simultaneously function as wetting agents also greatly reduces the likelihood that they will contribute to surface defects once the coating or ink formulation has dried.

Numerous classes of compounds and mixtures of compounds have been utilized for foam control in latex paint formulation. Silicones and silica particles dispersed in the oil phase of a water in oil emulsion are known to be effective in suppressing foam in aqueous systems. However, when utilized as foam control agents in latex paint manufacture, many of these silicon-based compounds and dispersions are known to impart undesirable effects to the final coating due to their incompatibility. Other known foam control agents including vegetable and mineral oils, and polyethers of alkylene oxides such as ethylene oxide, propylene oxide, and butylene oxide have been disclosed such as those disclosed in U.S. Pat. No. 4,836,951. Another class of molecules that are known to suppress foam formation in aqueous systems are acetylenic diols and alkane diols such as those disclosed in U.S. Pat. No. 6,762,208. In particular, the acetylenic diol 2,4,7,9-tetramethyldecyne-4,7-diol (TMDD) sold by Air Products Corporation under the trademark Surfynol 104® is widely utilized in aqueous systems.

More recently alkyl glycidyl ether adducts of diamines and polyamines have been disclosed in U.S. Pat. Nos. 6,746,623 and 6,656,977 as effective foam control agents. The preferred compositions found to be most effective at controlling foam formation were the 2:1 adducts of 2-ethylhexyl and isobutyl glycidyl ether with diamines and polyamines. No examples of adducts of diamines or polyamines with alkyl epoxides were disclosed.

We have now discovered that alkylene oxide derivatives of diamines and polyamines in which the alkylene oxide is a C4 to about C24 alkylene oxide are more effective foam control agents than the corresponding glycidyl ether adducts and thus represent a substantial improvement over the prior art. We have also discovered that when such alkylene oxide adducts of diamines and polyamines are neutralized, they not only suppress the formation of foam under dynamic conditions but also may simultaneously reduce or eliminate existing foam in such aqueous systems. We have further discovered that such alkylene oxide/amine adducts also reduce the dynamic surface tension thus providing the additional benefit of wetting in such systems. Moreover, to our knowledge, alkylene oxide adducts of diamines or polyamines in which the alkylene oxide contains four or more carbon atoms have not been previously reported in the literature and are thus novel compositions. These inventive compositions are liquids at normal use temperatures and thus are more easily handled than solid materials.

SUMMARY OF THE INVENTION

The present invention is directed to a compound of the formula (I)

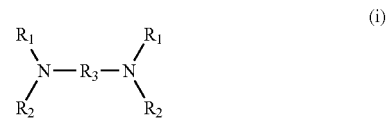

(i)

wherein $R_1$ and $R_2$ are independently selected from the group consisting of hydrogen or a $CH_2CH(OH)$—R group where R may be a linear or branched alkyl moiety containing from about 2 to about 24 carbon atoms, $R_3$ is independently selected from a group consisting of a linear or branched alkyl moiety containing from about 2 to about 8 carbons, a cycloaliphatic or aromatic moiety containing from about 6 to about 12 carbon atoms, a polyamine moiety of the formula

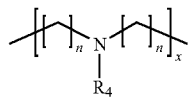

in which n is from about 2 to about 6, x from about 1 to about 6, and $R_4$ is independently selected from the group consisting of hydrogen or $CH_2CH(OH)$—R group where R is selected from the group consisting of a linear or branched alkyl moiety containing from about 2 to about 24 carbon atoms.

The invention also provides a compound of formula (ii)

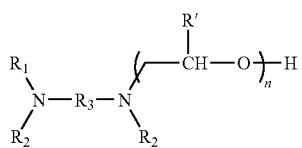

(ii)

wherein $R^1$ is hydrogen or $CH_3$ and n is from 2 to 100; $R_1$ and $R_2$ are a $CH_2CH(OH)$—R group wherein R is a linear or branched alkyl moiety containing from about 2 to about 24 carbon atoms, $R_3$ is selected from the group consisting of a linear or branched alkyl moiety containing from about 2 to about 8 carbons, a cycloaliphatic or aromatic moiety containing from about 6 to about 12 carbon atoms, a polyamine moiety of the formula

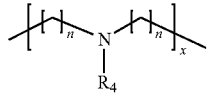

where n is from about 2 to about 6, x is from about 1 to about 6, and $R_4$ is selected from the group consisting of hydrogen and $CH_2CH(OH)$—R group where R is a linear or branched alkyl moiety containing from about 2 to about 24 carbon atoms.

The invention is also directed to a compound useful in controlling foam formation having the formula (iii)

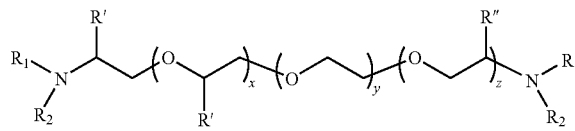

(iii)

wherein $R_1$ is a $CH_2CH(OH)R$ group and $R_2$ is independently selected from the group consisting of hydrogen, a $CH_2CH(OH)$—R group, where R is a linear or branched alkyl group containing from about 2 to about 20 carbon atoms, or where $R_1$ or $R_2$ may be a $CH_2CH(OH)$—O—R group where R is a $C_2$ to $C_{20}$ linear or branched alkyl ether group, and R' and R" are independently selected from $C_1$ to $C_{20}$ alkyl groups and may be the same or different.

The invention is further directed to compound useful in controlling foam formation having the formula (iv)

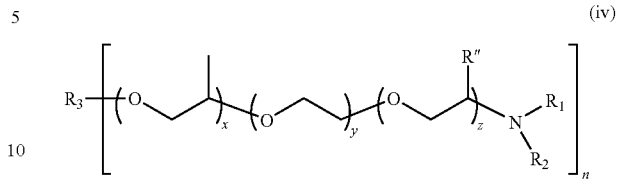

(iv)

where $R_3$ is a polyhydroxy functional alkyl group, with n being from 2 to about 6, where $R_1$ and $R_2$ are independently selected from the group consisting of hydrogen, a $CH_2CH(OH)$—R group, where R is a $C_2$ to $C_{20}$ linear or branched alkyl group containing from about 2 to about 20 carbon atoms, or where $R_1$ is $CH_2CH(OH)$—O—R and $R_2$ may be hydrogen or a $CH_2CH(OH)$—O—R group where R is a $C_2$ to $C_{20}$ linear or branched alkyl ether group, and R' and R" are $C_1$ to $C_{20}$ alkyl groups and may be the same or different.

BRIEF DESCRIPTION OF THE FIGURES

FIG. 1 describes the foam suppression performance of the compounds of Examples 1-4.

FIG. 2 shows the foam suppression performance of the compounds of Examples 7-12.

DETAILED DESCRIPTION OF THE INVENTION

This invention relates to compounds of formula (I)

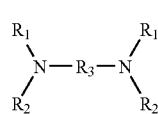

(i)

wherein $R_1$ and $R_2$ may be hydrogen or a $CH_2CH(OH)$—R group, where R may be a linear or branched alkyl moiety containing from about 2 to about 24 carbon atoms, where $R_3$ may be a linear or branched alkyl moiety containing from about 2 to about 8 carbons, or a cycloaliphatic or aromatic moiety containing from about 6 to about 12 carbon atoms. $R_3$ may also be a polyamine moiety of the formula

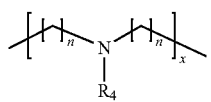

in which n may be from 2 to about 6, x may be from 1 to about 6, and $R_4$ may be hydrogen or $CH_2CH(OH)$—R group where R may be a linear or branched alkyl moiety containing from about 2 to about 24 carbon atoms. It will be recognized by those skilled in the art that the degree of alkoxylation of the diamine or polyamine will be limited by the number of primary or secondary amine groups present. It will also be recognized by those skilled in the art that such compounds will in reality be mixtures since the alkylene oxide may also react with the hydroxyl groups generated in the initial amine-epoxide reaction. The preferred degree of alkoxylation is from about 2 to about 8, and most preferably from 2 to 4. It will also be recognized by those familiar with the art that other diamine or polyamine functional compounds will serve as suitable precursors for the synthesis of compositions of the present invention and that the above structures should not be construed to limit the scope of the invention in any way.

The present invention also relates to compositions of formula (i) as shown above in which at least one of $R_1$, $R_2$, or $R_4$ is a hydrogen atom that is further reacted with ethylene or propylene oxide, or mixtures thereof, to give compositions of formula (ii)

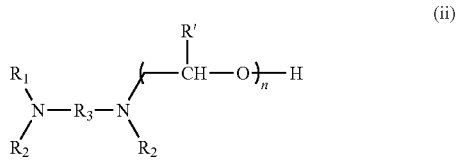

(ii)

wherein $R^1$ is either hydrogen or $CH_3$. The degree of ethoxylation and/or propoxylation is preferably from about 2 to about 100, and most preferably from about 2 to about 10. $R_1$ and $R_2$ are a $CH_2CH(OH)$—R group where R is be a linear or branched alkyl moiety containing from about 2 to about 24 carbon atoms, where $R_3$ may be a linear or branched alkyl moiety containing from about 2 to about 8 carbons, or a cycloaliphatic or aromatic moiety containing from about 6 to about 12 carbon atoms. $R_3$ may also be a polyamine moiety of the formula

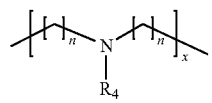

in which n may be from 2 to about 6, x may be from 1 to bout 6, and $R_4$ may be hydrogen or $CH_2CH(OH)$—R group where R may be a linear or branched alkyl moiety containing from about 2 to about 24 carbon atoms.

The invention further relates to compounds of formula (iii)

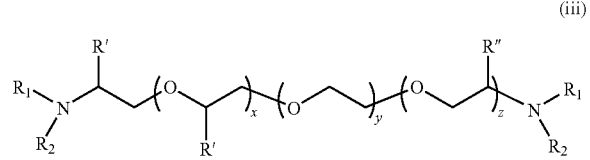

(iii)

where $R_1$ is a $CH_2CH(OH)R$ group and $R_2$ may be hydrogen or a $CH_2CH(OH)$—R group, where R is a linear or branched alkyl group containing from about 2 to about 20 carbon atoms, or where $R_1$ or $R_2$ may be a $CH_2CH(OH)$—O—R group where R is a $C_2$ to $C_{20}$ linear or branched alkyl ether group, and R' and R" are $C_1$ to $C_{20}$ alkyl groups and may be the same or different.

This invention also relates to compounds of formula (iv)

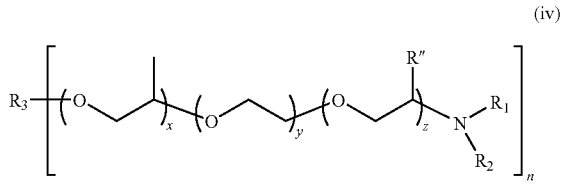

(iv)

where $R_3$ is a polyhydroxy functional alkyl group, with n being from 2 to about 6, where $R_1$ and $R_2$ may be hydrogen, a $CH_2CH(OH)$—R group, where R is a $C_2$ to $C_{20}$ linear or branched alkyl group containing from about 2 to about 20 carbon atoms, or where $R_1$ is $CH_2CH(OH)$—O—R and $R_2$ may be hydrogen or a $CH_2CH(OH)$—O—R group where R is a $C_2$ to $C_{20}$ linear or branched alkyl ether group, and $R^I$ and $R^{II}$ are $C_1$ to $C_{20}$ alkyl groups and may be the same or different.

In another embodiment of the present invention, compositions of formula (i), (ii), (iii) and (iv) may be neutralized with a suitable organic or mineral acid either neat or in water or a suitable solvent. Suitable organic acids include but are not limited to, acetic acid, lactic acid, and the like. Suitable mineral acids include but are not limited to hydrochloric acid, sulfuric acid, phosphoric acid and the like.

Suitable solvents include but are not limited to, water, glycols such as ethylene glycol, propylene glycol, hexylene glycol and the like, alcohols such as ethanol, propanol, butanol, 2-ethylhexanol, hexanol, heptanol and the like, and glycol ethers such as diethylene glycol, dipropylene glycol and the like. The addition of solvent to the inventive materials may improve defoaming, antifoaming, or wetting performance. This may be due to reducing the viscosity of the inventive compositions allowing more rapid spreading in the composition or over the surface of particulate materials. The solvent should be chosen to be compatible with other components in the formulation that includes the inventive materials.

The present invention also relates to the use of the compositions of formula (I), (ii), (iii) and (iv) as foam control agents in aqueous media. The disclosed compositions of formulas (i), (ii), (iii) and (iv) exhibit superior foam suppressing activity compared to previously known antifoam agents. In the preferred embodiments of the present invention, compositions of formula (i), (ii), (iii) and (iv) have been found to be exemplary agents for both the elimination and reduction of foam in aqueous systems. The industrial processes in which the disclosed compositions may be used include the manufacture of paper, ink, and latex paint, waste water treatment, detergent and cleaning formulations and cleaning or washing processes, distillations, oil and natural gas recovery, and any aqueous system or process in which foam is detrimental to conducting the particular process. The disclosed compositions are expected to be effective in a wide variety of systems, and the above examples are not intended to limit the use of the disclosed compositions in any way.

The present invention further relates to the use of compounds of formulae (i), (ii), (iii) and (iv) as wetting agents in waterborne systems as exhibited by their ability to reduce the dynamic surface tension of such systems. This is highly desirable in many aqueous formulations as the properties of the final film or coating are influenced by the amount and type of surfactants, dispersants and wetting agents that must be added in order to control foam and provide surface tension reduction. The ability of a particular additive to perform multiple functions in such systems is highly desirable since the amount of additional additives may be reduced, and consequently the effect on final surface properties may be minimized. In the preferred embodiments of the present invention, compositions of formula (i), (ii), (iii) and (iv) have been demonstrated to be exemplary agents for providing both foam control and surface tension reduction in aqueous systems.

The alkylene oxides suitable for the preparation of the compositions of formula (i) and (ii) of the present invention are 1,2-epoxides containing from 4 to about 20 carbon atoms in the alkyl chain. These include but are not limited to 1,2-epoxybutane, 1,2-epoxyhexane, 1,2-epoxyheptane, 1,2-epoxyoctane, 1-2-epoxydecane, 1,2-epoxynonane, 1,2-epoxydodecane, 1,2-epoxyhexadecane and the like. Branched alkylene oxides such as isobutylene oxide, 5-methyl-1,2-epoxyhexane, 2,4,4-trimethyl-1,2-epoxypentane, 1-phenyl-1,2-epoxybutane, 1-phenyl-2-methyl-1,2-epoxy-pentane may also be used. Alkylene oxides other than 1,2-epoxides such as 2,3-epoxybutane, 2-methyl-2,3-epoxypentane, 3,4-epoxyheptane, 3-ehoxy-4-propyl-3,4-epoxyheptane, cyclohexane oxide, styrene oxide and the like may also be used. Other suitable epoxide containing compounds are epoxidized oils such as epoxidized soybean oil. The preferred alkylene oxides are alkylene oxides containing from about four to about 24 carbon atoms. More preferred are those alkylene oxides containing from about 6 to about 14 carbon atoms and most preferred are those alkylene oxides containing from 8 to 12 carbon atoms.

Diamines and polyamines suitable for the preparation of compositions of formula (i) and (ii) of the present invention include, but are not limited to ethylenediamine, propylenediamine, butylenediamine, pentylene and hexylenediamine and the like. Suitable polyamines include, but are not limited to, diethylenetriamine, triethylenetriamine, tetraethylenepentamine and the like. Other linear or branched polyamines may also be utilized in the preparation of the compositions of the present invention. Suitable cycloaliphatic amines include, but are not limited to 1,2-diaminocylcohexane, 1,3-diaminocyclohexane, 1,4-diaminocylcohexane, 1,3 and 1,4 bis(aminocylcohexyl)methane and the like. Suitable aromatic diamines include, but are not limited to p-phenylenediamine, diaminodiphenyl ether, diaminodiphenyl methane and the like.

The compositions of formula (i) and (ii) of the present invention may be prepared by contacting the alkylene oxide and the diamine or polyamine at a temperature sufficient to open the epoxide ring. The reaction of amines with epoxide functional compounds is well known to those skilled in the art. The reaction is preferably carried out by slow addition of the alkylene oxide to the diamine or polyamine at a temperature between 80-150° C. Up to 2 equivalents of the alkylene oxide may be reacted with each equivalent of primary amine group of the diamine or polyamine.

Compositions of formulas (iii) and (iv) are the reaction products of polyether amines and alkylene oxides or glycidyl ethers. The polyether amines are amine capped ethylene oxide/propylene oxide block copolymers of molecular weight 200 to about 4000 g/mol, and are preferably polyoxypropylene diamines of molecular weight 200 to 400, and most preferably polyoxypropylene diamines of molecular weight 230 g/mol. Such polyether amines are available commercially and are sold under the trade name Jeffamine® by Huntsman Corporation, Houston, Tex.

The alkylene oxides suitable for the preparation of the compositions of the formulas (iii) and (iv) present invention are 1,2-epoxides containing from 4 to about 20 carbon atoms in the alkyl chain. These include but are not limited to 1,2-epoxybutane, 1,2-epoxyhexane, 1,2-epoxyheptane, 1,2-epoxyoctane, 1-2-epoxydecane, 1,2-epoxynonane, 1,2-epoxydodecane, 1,2-epoxyhexadecane and the like. Branched alkylene oxides such as isobutylene oxide, 5-methyl-1,2-epoxyhexane, 2,4,4-trimethyl-1,2-epoxypentane, 1-phenyl-1,2-epoxybutane, 1-phenyl-2-methyl-1,2-epoxypentane may also be used. Alkylene oxides other than 1,2-epoxides such as 2,3-epoxybutane, 2-methyl-2,3-epoxypentane, 3,4-epoxyheptane, 3-ehoxy-4-propyl-3,4-epoxyheptane, cyclohexane oxide, styrene oxide and the like may also be used. Other suitable epoxide containing compounds are epoxidized oils such as epoxidized soybean oil. The preferred alkylene oxides are alkylene oxides containing from about four to about 24 carbon atoms. More preferred are those alkylene oxides containing from about six to about 14 carbon atoms and most preferred are those alkylene oxides containing from eight to twelve carbon atoms.

The glycidyl ethers suitable for the preparation of the compositions of formulas (iii) and (iv) of the present invention may be linear or branched, and include, but are not limited to butyl glycidyl ether, hexyl glycidyl ether, 2-ethylhexyl glycidyl ether, pentyl glycidyl ether, octyl glycidyl ether, nonyl glycidyl ether decyl glycidyl ether, dodecyl glycidyl ether, lauryl glycidyl ether, myristyl glycidyl ether and the like.

The compositions (iii) and (iv) of the present invention may be prepared by contacting the alkylene oxide or glycidyl ether at a temperature sufficient to open the epoxide ring. Reaction of amines with epoxide functional compounds is well known to those skilled in the art. The reaction is preferably carried out by slow addition of the alkylene oxide or glycidyl ether to the polyether amine at a temperature between 80-150° C. Up to 2 equivalents of the alkylene oxide or glycidyl ether may be reacted with each equivalent of primary amine group of the polyether amine. It is preferred to react one equivalent of alkylene oxide per primary amine group in the polyether amine.

The products of these reactions may be purified by means known to those skilled in the art; however, we have found that further purification is usually unnecessary. The products from reaction of the primary amine groups of the diamines or polyamines amines with alkylene oxide will actually be mixtures since they will also contain varying amounts of molecules derived from the reaction of the hydroxyl groups that are generated with the alkylene oxide.

The amount of the compositions of the present invention necessary for effective foam suppression will vary according to the application in which they are used. In general, they are preferably used in an amount from 0.01 to about 10 wt. % based on the total weight of the aqueous system, more preferably from about 0.1 to 1.0 wt. %, and most preferably from about 0.1 to 0.5 wt. % based on the total weight of the aqueous system in which they are used.

The compositions of formula (i), (ii), (iii) and (iv) of this invention may be coated onto pulverulent or fibrous solid materials such as organic pigments or polyester fibers prior to their addition to water as part of an aqueous formulation or dispersion. The materials coated in this way are more easily dispersed into the aqueous medium and foaming is minimized.

The compositions of formula (iii) and (iv) have low water solubility. Therefore it often will be useful to combine them with other materials such as emulsifiers, dispersants, wetting agents, solvents, or water in order to improve their delivery into water-based formulations in which foam avoidance is desired. Combinations of the subject antifoam agents with other antifoam agents or defoam agents can be envisioned in order to optimize the performance of the final formulation.

The preparation of compositions of the present invention and the evaluation of these compositions as foam control agents and wetting agents are illustrated by the following examples. These examples are for illustrative purposes and are not intended to limit the scope of the invention in any way.

EXAMPLES

Examples 1-4 illustrate the general synthesis of compounds of the present invention. All reactions were carried out by the addition of two moles of the alkylene oxide to the diethylenetriamine. Diethylenetriamine was purchased from Aldrich Chemical Co. and was used as received. The alkylene oxides were synthesized by known procedures. All reactions were carried out under a nitrogen blanket and the progress of the reaction was monitored by gas chromatography.

Example 1

20.0 g (0.194) mol of diethylenetriamine was charged to a 100 mL three-neck round-bottomed flask equipped with a thermocouple, nitrogen inlet, magnetic stirring bar and an addition funnel and heated. When the temperature reached 120° C., 38.8 g (0.39 mol) of 1-epoxyhexane was slowly added over a period of 30 minutes during which time the temperature of the reaction mixture rose to 160-170° C. The reaction temperature was then maintained at 160° C. until GC analysis showed no epoxyhexane remaining. The reaction product was cooled to 30° C. and isolated as a light yellow viscous liquid. The reaction product was used without further purification.

Example 2

20.0 g (0.194 mol) of diethylenetriamine was charged to a 100 mL three-neck round-bottomed flask equipped with a thermocouple, nitrogen inlet, magnetic stirring bar and an addition funnel and heated. When the temperature reached 120° C., 50.0 g (0.39 mol) of 1-epoxyoctane was slowly added over a period of 30 minutes during which time the temperature of the reaction mixture rose to 160-170° C. The reaction temperature was then maintained at 160° C. until GC analysis showed no 1-epoxyoctane remaining. The reaction product was cooled to 30° C. and isolated as a light yellow viscous liquid. The reaction product was used without further purification.

Example 3

20.0 g (0.194 mol) of diethylenetriamine was charged to a 100 mL three-neck round-bottomed flask equipped with a thermocouple, nitrogen inlet, magnetic stirring bar and an addition funnel and heated. When the temperature reached 120° C., 60.6 g (0.39 mol) of 1-epoxydecane was slowly added over a period of 30 minutes during which time the temperature of the reaction mixture rose to 160-170° C. The reaction temperature was then maintained at 160° C. until GC analysis showed no 1-epoxydecane remaining. The reaction product was cooled to 60° C., filtered to remove some insoluble material, and isolated as a light yellow viscous liquid. The reaction product was used without further purification.

Example 4

5.0 g (0.048 mol) of diethylenetriamine was charged to a 100 mL three-neck round-bottomed flask equipped with a thermocouple, nitrogen inlet, magnetic stirring bar and an addition funnel and heated. When the temperature reached 130° C., 17.8 g (0.096 mol) of 1-epoxydodecane was slowly added over a period of 30 minutes during which time the temperature of the reaction mixture rose to 170-180° C. The reaction temperature was then maintained at 160° C. until GC analysis showed no 1-epoxydodecane remaining. The reaction product was cooled to 30° C. and isolated as a yellow viscous liquid. The reaction product was used without further purification.

Examples 5A-5D

The composition of example 2 (diethylenetriamine/2 mol 1-epoxyoctane adduct) was subsequently reacted with from 3 to 100 mol of ethylene oxide (Examples 5A-5D) and the foam control properties and dynamic surface tension were measured. The defoaming ability of the compositions of example 5 was evaluated by measuring the rate at which a foam column collapsed after the addition of 1 drop of the above compositions to a foam column. The foam column was generated in a graduated cylinder by shaking 50 mL of a 0.1% solution of sodium lauryl sulfate until the foam column fills the cylinder. After addition of the composition to be evaluated, the rate of foam collapse is then measured.

The antifoaming properties of the above compositions were evaluated using the blender foam test as described below. Surface tensions were determined using a SensaDyne OC-6000 double-probe bubble tensiometer. Equilibrium surface tensions were determined on 0.1% active solutions in deionized water at 25° C. by using a bubble rate of one bubble per second. The results are summarized in Table 2.

Examples 6A-6D

The composition of example 2 (diethylenetriamine/2 mol 1-epoxyoctane adduct) was subsequently neutralized with various acids both with and without added solvent. The foam control properties and dynamic surface tension were measured. The defoaming ability of the compositions of example 5 was evaluated by measuring the rate at which a foam column collapsed after the addition of 1 drop of the above compositions to a foam column. The foam column was generated in a graduated cylinder by shaking 50 mL of a 0.1% active solution of sodium lauryl sulfate until the foam column fills the cylinder. After addition of the composition to be evaluated, the rate of foam collapse is then measured.

The antifoaming properties of the above compositions were evaluated using the blender foam test described below. Surface tensions were determined using a SensaDyne OC-6000 double-probe bubble tensiometer. Equilibrium surface tensions were determined on 0.1% active solutions in deionized water at 25 deg C. by using a bubble rate of one bubble per second. The results are summarized in Table 3.

COMPARATIVE EXAMPLES

Comparative Example 1

The 2:1 2-ethylhexyl glycidyl ether adduct of diethylenetriamine.

Comparative Example 2

The 2:1 isobutyl glycidyl ether adduct of diethylenetriamine.

The glyceryl ether adducts of diethylenetriamine previously reported in U.S. Pat. No. 6,656,977 were synthesized by identical procedures as those described above. Both 2-ethylhexyl glycidyl ether and isobutyl glycidyl ether were purchased from Aldrich Chemical Co. and were used without further purification.

Comparative Example 3

2,4,7,9-tetramethyldecyne-4,7-diol (Surfynol 104®)

Evaluation of Compositions as Antifoam Agents

The compounds synthesized in Examples 1-4 were evaluated in foam suppression using the ASTM-D3519 blender foam test. 200 mL of a 0.1 wt. % dioctyl sodium sulfosuccinate solution were added to a Waring Blender. 0.4 g of each compound to be tested was then added as 50 wt. % solutions in 2-ethylhexanol and were added at 0.2 wt. % based on the total weight at 25° C. The blender was turned on for 30 seconds and at the end of that time the initial foam height was measured. The foam height was then monitored as a function of time. 0.2 wt. % controls of Comparative Example 1 and Comparative Example 2 were also run as 50 wt. % solutions in 2-ethylhexanol. The results are summarized in Table 1 and illustrated in FIG. 1.

until a foam column fills the cylinder to the base of the plug. The plug is then removed and the foam is allowed to equilibrate for 30 seconds. To collapse the foam, one drop of the test defoaming liquid is dropped from a pipette onto to the top of the foam from a height of I (one) cm. The times for the foam to collapse to the 90, 80, 70, 60 and 50 ml marks are then recorded. The times are then reported for the foam to collapse to heights of 40, 30, 20, 10 and 0 ml. The 0 ml foam height was generally recorded as "none."

TABLE 1

ASTM-D3519 Blender Foam Test
Foam Height (cm) vs. Time (min)

| Example | Composition | Initial | 5 min | 10 min | 15 min | 20 min |
|---|---|---|---|---|---|---|
| Control | DOSS | 12.5 | 10.2 | 8.5 | 6.1 | 4.3 |
| 5 | DOSS/Example 1 | 1.5 | 3 minutes to no foam | — | — | — |
| 6 | DOSS/Example 2 | 1.4 | 3 minutes to no foam | — | — | — |
| 7 | DOSS/Example 3 | 1.3 | 3 minutes to no foam | — | — | — |
| 8 | DOSS/Example 4 | 1.2 | 3 minutes to no foam | — | — | — |
| Comparative 1 | DOSS/Comparative 1 | 2.0 | 0.3 | 8 minutes to no foam | — | — |
| Comparative 2 | DOSS/Comparative 2 | 2.2 | 0.9 | 0.4 | 13 minutes to no foam | — |

The data clearly demonstrates that the alkylene oxide derivatives of diethylenetriamine are substantially more effective in preventing the formation of foam under dynamic conditions than the previously disclosed glycidyl ether adducts.

Evaluation of Ethoxylated Diethylenetriamine/2 mol 1-Epoxyoctane Adducts as Foam Control Agents and Wetting Agents Defoaming Performance For these tests, "defoaming" is defined as the rate at which a foam column will collapse after being inoculated with a small amount of defoaming agent. These determinations are made by noting the times required for 1 drop of the defoaming liquid to collapse a foam that has been generated in a 100 ml graduated cylinder: the faster the collapse of the foam, the better the defoamer. To create the foam, 50 ml of a 0.1% active solution of a test foaming agent (in this case, sodium lauryl sulfate) is introduced into the cylinder, capped with a plug, and shaken (by hand, one stroke a second, for one minute)

Antifoaming Performance

For these tests, "antifoaming" is defined as the capacity of an agent to retard or prevent foam formation. These determinations are made by noting the rate of rise of a foam column that is generated by shearing an aqueous mixture of both foaming agent and antifoaming compound. The test mixtures consist of solutions that are 0.1% sodium lauryl sulfate and 0.1% active antifoaming compound. 100 ml of these solutions were placed in the bowl of a Waring blender and the machine run at high speed for one minute. At the end of a minute, the blender was shut off and the height of the foam head was noted. The shorter the head of foam generated, the better the antifoaming agent, the ideal being no foam at all.

Surface Tension

Surface tension measurements were carried out using a Sensation QC-6000 double-probe bubble tensiometer from the Sensation Division of Chem-Dyne Research Corp. of Mesa, Ariz. Equilibrium surface tensions were determined on 0.1% active solutions in deionized water at 25 deg C. by using a bubble rate of 1 (one) bubble per second.

TABLE 2

Foam Control Evaluation and Surface Tension Reduction of Ethoxylated Diethylenetriamine/2 mol Epoxyoctane Compositions

| Example/Composition | Solubility | Surface Tension | Defoaming | Antifoaming (waring) |
|---|---|---|---|---|
| 2 DETA/2 mol Epoxyoctane | Dispersible @ 0.1% | 36.2 | 60 sec. = 25 ml<br>90 sec. = 10 ml<br>120 sec. = 5 ml | Initial ml = 100 ml<br>Initial cm = 1.8 cm<br>5 min. = 0.8 cm<br>10 min. = 0.5 cm |
| 5A DETA/2 mol Epoxyoctane (POE 3) | Dispersible @ 0.1% | 35.6 | 60 sec. = 30 ml<br>90 sec. = 15 ml<br>120 sec. = 10 ml | Initial ml = 100 ml<br>Initial cm = 1.8 cm<br>5 min. = 0.8 cm<br>10 min. = 0.5 cm |

TABLE 2-continued

Foam Control Evaluation and Surface Tension Reduction of Ethoxylated Diethylenetriamine/2 mol Epoxyoctane Compositions

| Example/Composition | Solubility | Surface Tension | Defoaming | Antifoaming (waring) |
|---|---|---|---|---|
| 5B DETA/2 mol Epoxyoctane (POE 5) | Dispersible @ 0.1% | 35.7 | 60 sec. = 50 ml<br>90 sec. = 45 ml<br>120 sec. = 40 ml | Initial ml = 200 ml<br>Initial cm = 3.7 cm<br>5 min. = 1.9 cm<br>10 min. = 1.3 cm |
| 5C DETA/2 mol Epoxyoctane (POE 10) | Dispersible @ 0.1% | 39.3 | 60 sec. = 60 ml<br>90 sec. = 50 ml<br>120 sec. = 48 ml | Initial ml = 600 ml<br>Initial cm = 8.5 cm<br>5 min. = 4.0 cm<br>10 min. = 3.0 cm |
| 5D DETA/2 mol Epoxyoctane (POE 100) | Soluble | 55.9 | 60 sec. = 50 ml<br>90 sec. = 49 ml<br>120 sec. = 49 ml | Initial ml = 600 ml<br>Initial cm = 8.5 cm<br>5 min. = 5.7 cm<br>10 min. = 4.3 cm |
| Comparative Example 3 2,4,7,9-tetramethyldecyne-4,7-diol (Surfynol 104 ®) | Insoluble | 40.5 | 60 sec. = 25 ml<br>90 sec. = 25 ml<br>120 sec. = 20 ml | Initial ml = 600 ml<br>Initial cm = 8.5 cm<br>5 min. = 4.2 cm<br>10 min. = 3.0 cm |

The data in Table 2 show a trend towards decreasing effectiveness in both defoaming and antifoaming activity of the diethylenetriamine/2 mol epoxyoctane adduct as the degree of ethoxylation is increased; however, the three, five, and ten mol ethylene oxide adducts all exhibit lower surface tension than the control 2,4,7,9-tetramethydecyne-4,7-diol. The defoaming and antifoaming activity of the ethoxylated adducts is generally less than the control, while the activity of the diethylenetriamine/2 mol epoxyoctane adduct (Example 3) is substantially better than the control.

variation associated with the solvent (with the exception of water), the neutralized adduct shows exceptional activity in both foam knockdown and the prevention of foam formation under dynamic conditions. Neutralization does in general result in an increase in the surface tension and reduced wetting; however, the compositions of Examples 6A and 6E are comparable in surface tension reduction to 2,4,7,9-tetramethyldecyne-4,7-diol (Surfynol 104®).

Examples 7-12 below illustrate the general synthesis of compounds of formula (iii) and (iv) of the present invention. 2-ethylhexyl glycidyl ether was purchased from Aldrich

TABLE 3

Foam Control Evaluation and Surface Tension Reduction of Neutralized Diethylenetriamine/2 mol Epoxyoctane Compositions

| Example/Composition | pH | Solubility | Surface Tension | Defoaming | Antifoaming (shaking) | Antifoaming (waring) |
|---|---|---|---|---|---|---|
| 2 Diethylenetriamine/2 mol epoxyoctane | 10.9 | Dispersible @ 0.1% With droplets | 36.2 | 60 sec. = 25 ml<br>90 sec. = 10 ml<br>120 sec. = 5 ml | 33 ml | Initial ml = 100 ml<br>Initial cm = 1.7 cm<br>5 min. = None<br>10 min. = None |
| 6A Diethylenetriamine/2 mol epoxyoctane = 10 g<br>Acetic Acid = 3.7 g | 7.3 | Dispersible @ 0.1% | 46.6 | 21 sec. = None | None | None |
| 6B Diethylenetriamine/2 mol epoxyoctane = 10 g<br>Acetic Acid = 3.7 g<br>DI H2O = 5 g | 6.85 | Dispersible @ 0.1% | 50.9 | 21 sec. = none | 35 ml | Initial ml = 75 ml<br>Initial cm = 1.0 cm<br>5 min. = 0.5 cm<br>10 min. = 0.4 cm |
| 6C Diethylenetriamine/2 mol epoxyoctane = 10 g<br>Acetic Acid = 3.7 g<br>Hexylene Glycol = 5 g | 7.21 | Dispersible @ 0.1% | 51.3 | 16 sec. = 2 ml | None | None |
| 6D Diethylenetriamine/2 mol epoxyoctane = 10 g<br>Acetic Acid = 3.7 g<br>Ethylene Glycol = 5 g | 7.07 | Dispersible @ 0.1% | 51.4 | 19 sec. = 2 ml | None | None |
| 6D Diethylenetriamine/2 mol epoxyoctane = 10 g<br>Acetic Acid = 3.7 g<br>Propylene Glycol = 5 g | 7.22 | Dispersible @ 0.1% | 52.8 | 21 sec. = 1 ml | None | Initial cm = 0.2 cm<br>3 min. = None |
| 6E Diethylenetriamine/2 mol epoxyoctane = 10 g<br>Acetic Acid = 3.7 g<br>2-Ethylhexanol = 5 g | 7.10 | Dispersible @ 0.1% | 41.4 | 30 sec. = None | 15 ml | Initial cm = 0.4 cm<br>4 min. = None |

The data in Table 3 show that pH has a dramatic effect on both the defoaming and antifoaming activity of the diethylenetriamine/2 mol epoxyoctane composition. While there is some Chemical Co. and was used as received. The alkylene oxides were synthesized by known procedures. All reactions were carried out under a nitrogen blanket and the progress of the reaction was monitored by Gas Chromatography. The polyether amine utilized was a polyoxypropylene diamine with a molecular weight of 230 g/mol sold as Jeffamine® D 230 by Huntsman Corporation, Houston Tex. and was used as received.

Example 7

2:1 Epoxyhexane/Polyoxypropylene Diamine Adduct 40.0 g (0.174 mol) of a polyoxypropylene diamine having a molecular weight of 230 g/mol was charged to a 100 mL three-neck round-bottomed flask equipped with a thermocouple, nitrogen inlet, magnetic stirring bar and an addition funnel. When the temperature reached 120° C., 34.8 g (0.35 mol) of epoxyhexane was slowly added over a period of 30 minutes during which time the temperature of the reaction mixture rose to 160-170° C. The reaction temperature was then maintained at 160° C. until GC analysis showed no epoxyhexane remained. The reaction product was cooled to 30° C. and isolated as a light yellow viscous liquid. The reaction product was used without further purification.

Example 8

2:1/Epoxyoctane/Polyoxypropylene Diamine Adduct 30.0 g (0.13 mol) of a polyoxypropylene diamine having a molecular weight of 230 g/mol was charged to a 100 mL three-neck round-bottomed flask equipped with a thermocouple, nitrogen inlet, magnetic stirring bar and an addition funnel. When the temperature reached 120° C., 33.4 g (0.26 mol) of epoxyoctane was slowly added over a period of 30 minutes during which time the temperature of the reaction mixture rose to 160-170° C. The reaction temperature was then maintained at 160° C. until GC analysis showed no epoxyoctane remaining. The reaction product was cooled to 30° C. and isolated as a light yellow viscous liquid. The reaction product was used without further purification.

Example 9

4:1/Epoxyoctane/Polyoxypropylene Diamine Adduct 25.0 g (0.108 mol) of a polyoxypropylene diamine having a molecular weight of 230 g/mol was charged to a 100 mL three-neck round-bottomed flask equipped with a thermocouple, nitrogen inlet, magnetic stirring bar and an addition funnel. When the temperature reached 120° C., 55.7 g (0.435 mol) of epoxyoctane was slowly added over a period of 30 minutes during which time the temperature of the reaction mixture rose to 160-170° C. The reaction temperature was then maintained at 160° C. until GC analysis showed no epoxyoctane remained. The reaction product was cooled to 30° C. and isolated as a light yellow viscous liquid. The reaction product was used without further purification.

Example 10

2:1/Epoxydecane/Polyoxypropylene Diamine Adduct 25.0 g (0.108 mol) of a polyoxypropylene diamine having a molecular weight of 230 g/mol was charged to a 100 mL three-neck round-bottomed flask equipped with a thermocouple, nitrogen inlet, magnetic stirring bar and an addition funnel. When the temperature reached 130° C., 33.7 g (0.217 mol) of epoxydecane was slowly added over a period of 30 minutes during which time the temperature of the reaction mixture rose to 170-180° C. The reaction temperature was then maintained at 160° C. until GC analysis showed no epoxydecane remained. The reaction product was cooled to 30° C. and isolated as a yellow viscous liquid. The reaction product was used without further purification.

Example 11

2:1/Epoxydodecane/Polyoxypropylene Diamine Adduct 25.0 g (0.108 mol) of a polyoxypropylene diamine having a molecular weight of 230 g/mol was charged to a 100 mL three-neck round-bottomed flask equipped with a thermocouple, nitrogen inlet, magnetic stirring bar and an addition funnel. When the temperature reached 130° C., 40.1 g (0.217 mol) of epoxydodecane was slowly added over a period of 30 minutes during which time the temperature of the reaction mixture rose to 170-180° C. The reaction temperature was then maintained at 160° C. until GC analysis showed no epoxydodecane remained. The reaction product was cooled to 30° C. and isolated as a yellow viscous liquid. The reaction product was used without further purification.

Example 12

2:1/2-Ethylhexyl glycidyl ether/Polyoxypropylene Diamine Adduct 25.0 g (0.108 mol) of a polyoxypropylene diamine having a molecular weight of 230 g/mol was charged to a 100 mL three-neck round-bottomed flask equipped with a thermocouple, nitrogen inlet, magnetic stirring bar and an addition funnel. When the temperature reached 130° C., 40.5 g (0.217 mol) of 2-ethylhexyl glycidyl ether was slowly added over a period of 30 minutes during which time the temperature of the reaction mixture exothermed to 170-180° C. The reaction temperature was then maintained at 160° C. until GC analysis showed no 2-ethylhexyl glycidyl ether remained. The reaction product was cooled to 30° C. and isolated as a light yellow viscous liquid. The reaction product was used without further purification.

Evaluation of Compounds of Examples 7-12 as Antifoam Agents

The compounds synthesized in Examples 7-12 were evaluated in foam suppression using the ASTM-D3519 blender foam test. 200 mL of a 0.1 wt. % dioctyl sodium sulfosuccinate solution were added to a Waring Blender. 0.4 g of each compound to be tested was then added as 50 wt. % solutions in 2-Ethylhexanol and were added at a 0.2 wt. % based on the total weight at 25° C. The blender was turned on for 30 seconds and the initial foam height was measured. The foam height was then monitored as a function of time. 0.2 wt. % controls of the known foam control agents 2,4,7,9-tetramethyldecyne-4,7-diol (TMDD), and of the polyether amine 3700 described previously and disclosed in U.S. Pat. No. 4,075,130. were run for comparative purposes. The results are summarized in Table 4 and illustrated in FIG. 2.

TABLE 4

ASTM-D3519 Blender Foam Test
Foam Height (cm) vs. Time (min)

| Example | Composition | Initial | 5 min | 10 min | 15 min | 20 min |
|---|---|---|---|---|---|---|
| Control | DOSS | 12.5 | 10.2 | 8.5 | 6.1 | 4.3 |
| 7 | DOSS/Example 1 | 2.5 | 0.5 | 7 minutes to no foam | — | — |
| 8 | DOSS/Example 2 | 1.4 | 5 minutes to no foam | | — | — |
| 9 | DOSS/Example 3 | 2.8 | 1.1 | 0.2 | — | — |
| 10 | DOSS/Example 4 | 2.0 | 0.6 | 8 minutes to no foam | — | — |
| 11 | DOSS/Example 5 | 1.9 | 0.4 | 7 minutes to no foam | — | — |
| 12 | DOSS/Example 6 | 2.4 | 0.6 | 10 minutes to no foam | — | — |
| Comparative 1 | TMDD | 8.1 | 4.0 | 1.9 | 0.9 | 0.0 |
| Comparative 2 | Polyether amine 3700 | 8.0 | 3.7 | 2.5 | 1.2 | 0.2 |

All patents, patent applications and publications cited in this application including all cited references in those applications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A compound of the formula (i)

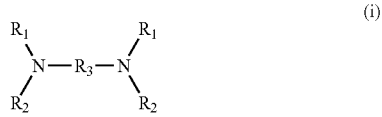

(i)

wherein $R_1$ and $R_2$ are independently selected from the group consisting of hydrogen or a $CH_2CH(OH)$—R group where R is a linear or branched alkyl moiety containing from about 2 to about 24 carbon atoms with the proviso that R1 and R2 can not all be simultaneously hydrogen, $R_3$ is independently selected from a group consisting of a linear or branched alkyl moiety containing from about 2 to about 8 carbons, a cycloaliphatic or aromatic moiety containing from about 6 to about 12 carbon atoms, a polyamine moiety of the formula

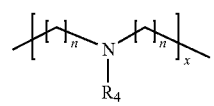

in which n is from about 2 to about 6, x from about 1 to about 6, and $R_4$ is independently selected from the group consisting of hydrogen or $CH_2CH(OH)$—R group where R is selected from the group consisting of a linear or branched alkyl moiety containing from about 2 to about 24 carbon atoms.

2. A method for controlling foam in an aqueous system which comprises adding a compound of claim 1 to said aqueous system.

3. The compounds of claim 1 neutralized with a suitable mineral acid or optionally an organic carboxylic acid, or phosphoric acid.

4. The compounds of claim 1, dissolved in a suitable solvent selected from the group of alcohols, glycols, glycol ethers or mixtures thereof.

5. A method for controlling foam formation in aqueous systems selected from the group consisting of paper, ink, and latex paint manufacture, waste water treatment, cleaning and detergent compositions and processes, oil and natural gas refining, and any processes conducted in an aqueous environment requiring foam control that comprises addition of the compositions of claim 1 in an amount that is sufficient to eliminate or reduce existing foam and/or in an amount sufficient to further suppress the formation of foam.

6. A method for reducing the dynamic surface tension in aqueous systems selected from the group consisting of paper, ink, and latex paint manufacture, waste water treatment, cleaning and detergent compositions and processes, oil and natural gas refining, and any processes conducted in an aqueous environment requiring foam control that comprises addition of compositions of claim 1 in an amount that is sufficient to reduce the dynamic surface tension of such systems.

7. A method for wetting and/or dispersing organic and/or inorganic pigments and/or fillers comprising combining a compound of claim 1 with the organic and/or inorganic pigment and/or filler.

8. A pulverulent or fibrous material coated with the compounds of claim 1.

9. A pigment paste comprising pigments, binders, and the compound of claim 1.

* * * * *